US006638551B1

(12) United States Patent
Levy et al.

(10) Patent No.: US 6,638,551 B1
(45) Date of Patent: Oct. 28, 2003

(54) METHODS AND COMPOSITIONS FOR PURIFYING EDIBLE OIL

(75) Inventors: Ehud Levy, Roswell, GA (US); Cang Li, Alpharetta, GA (US); Mohammed Tazi, Alpharetta, GA (US)

(73) Assignee: Selecto Scientific, Inc., Suwanee, GA (US)

( * ) Notice: Subject to any disclaimer, the term of this patent is extended or adjusted under 35 U.S.C. 154(b) by 0 days.

(21) Appl. No.: 10/092,226

(22) Filed: Mar. 5, 2002

(51) Int. Cl.$^7$ ................................................. A23D 9/06
(52) U.S. Cl. ...................... 426/330.6; 426/417; 426/423
(58) Field of Search ............................ 426/330.6, 417, 426/422, 423

(56) References Cited

U.S. PATENT DOCUMENTS

| 4,112,129 A | * | 9/1978 | Duensing et al. ........... 426/417 |
| 4,629,588 A | * | 12/1986 | Welsh et al. ................ 554/176 |
| 4,764,384 A | * | 8/1988 | Gyann ....................... 426/417 |
| 4,880,574 A | * | 11/1989 | Welsh ........................ 554/176 |
| 4,956,126 A | * | 9/1990 | Staal et al. ................. 554/191 |
| 5,133,871 A | | 7/1992 | Levy ........................... 210/688 |
| 5,252,762 A | * | 10/1993 | Denton ....................... 554/196 |
| 5,298,639 A | * | 3/1994 | Toeneboehn et al. ....... 554/192 |
| 5,336,794 A | * | 8/1994 | Pryor et al. ................. 554/192 |
| 5,348,755 A | * | 9/1994 | Roy ............................ 426/541 |
| 5,391,385 A | * | 2/1995 | Seybold ...................... 426/417 |
| 5,597,600 A | | 1/1997 | Munson et al. ........... 426/330.6 |
| 6,187,355 B1 | * | 2/2001 | Akoh et al. .............. 426/330.3 |
| 6,248,911 B1 | | 6/2001 | Canessa et al. ............ 554/191 |
| 2003/0054509 A1 | * | 3/2003 | Lee et al. .................... 435/134 |

OTHER PUBLICATIONS

Adsorbents Woelm, pp. 100–102 (prior to filing date).

* cited by examiner

*Primary Examiner*—Carolyn Paden
(74) *Attorney, Agent, or Firm*—Kilpatrick Stockton LLP; Bruce D. Gray (57) ABSTRACT

The invention relates to methods and compositions for removing contaminants from edible cooking oils. Reduction in the accumulation of contaminants such as polar materials, free fatty acids, metals, color bodies, and soaps is achieved by treating the oil with a composition containing effective amounts of silica, acidic alumina, clay and citric acid. Removal of contaminants from oil according to the methods and compositions of the invention improves the quality of the oil and reduces costs as well as various health and safety concerns associated with the production of fried foods.

44 Claims, 7 Drawing Sheets

METHODS AND COMPOSITIONS FOR PURIFYING EDIBLE OIL

BACKGROUND OF THE INVENTION

1. Field of the Invention

This invention relates to processes and compositions for purifying edible cooking oils. The compositions and processes of the present invention remove various oil contaminants such as color bodies, polar materials, soaps, fatty acids and trace metals, thereby improving the quality of, and extending the usable life of, the oil.

2. Description of Related Art

Edible frying oils, which are typically used to fry various foods such as chicken, French fries, potato chips, and other meat, vegetable or dough products, can decompose over time and with use due to the formation and acquisition of various contaminants released or produced during cooking. Contaminants such as water, soaps, polar compounds, polymers, free fatty acids, color bodies, and trace metals build up in the oil over time and contribute to the degradation and increased instability of the oil. As these contaminants build up in the oil, the oil can become discolored, develop a displeasing smell and taste, begin to foam due to the formation of soaps, produce heavy smoke at normal cooking temperatures, and/or quickly become rancid and unusable.

Without treatment this degeneration typically occurs rapidly, requiring complete replacement of the used oil with fresh oil as often as every 2 or 3 days, thereby significantly raising the cost of production of fried foods. The FDA Food Safety and Inspection Service (FSIS) Meat and Poultry Inspection Manual provides guidelines that must be observed by industrial meat and poultry fryers. For instance, Section 18.40(a), directed to frying of meat, explains that the suitability of fats and oils used for deep fat frying "can be determined from the degree of foaming during use or from color, odor, and flavor." Additionally the Manual indicates that "fat or oil should be discarded when it foams over the vessel's side during cooking, or when its color becomes almost black as viewed through a colorless glass container." Of course, the amount of time that fats and oils may be used for frying varies depending upon a number of factors, such as the type and volume of food fried, the temperature, the quality of new oil or fat added and the frequency of addition or new oil or fat, as well as the treatment used for decontamination of the oil.

The various contaminants that accumulate in the oil create several problems with the oil and the food fried in the oil. For instance, the high cooking temperatures and the water released from the food being fried causes the formation of free fatty acids. The free fatty acids combine with various trace metals in the oil to form soaps. Soaps not only cause unpleasant foaming of the oil, which can present a safety hazard for those operating the frying equipment, but also cause the food to absorb more of the oil during cooking. The absorption of more oil not only results in a greasier, less desirable product but may also result in the food product becoming overcooked, giving it a harder or tougher consistency than desired.

The accumulation of polar compounds is another serious problem in used oil. Polar compounds contribute to unpleasant taste and increased oxidation which leads to the oil becoming rancid and completely unusable. A build up of polar compounds in the oil also leads to a reduction in the smoke point of the oil. Carmelization, caused by buildup of color bodies that turn the oil a darker color, produces fried food with a darker, overcooked and unappealing appearance. Trace metals such as magnesium, phosphorous, copper, and iron also increase the oxidation of the oil by reacting with oxygen in the air to catalyze the oxidation process. This increases the peroxide value of the oil indicating increased instability and promoting further oxidation and rapid spoiling of the oil.

Combinations of impurities, such as free fatty acids and polar compounds can result in the formation of a film on the surfaces of the frying equipment. Additionally, buildup of fat and other impurities will reduce the smoke point of the oil, causing the oil to smoke heavily at operating temperatures of around 300° F. To prevent the problems associated with the buildup of these contaminants, oil must either be replaced often, or treated to remove or neutralize the contaminants, thereby extending the life of the oil.

Known cooking oil treatments, or "frying aids," have various drawbacks. For instance, some treatments do not address more than one or two of the above-mentioned problems, while others fail to significantly extend the life of the oil, and some even introduce additional health and/or safety concerns. One method directed to reducing soap formation involves heating the oil to 300° F. and mixing the oil with a composition of water, a porous carrier and a food-compatible acid. Similarly, another method involves contacting the oil with a food-compatible acid to help counteract soap formation. Both of these methods help eliminate soaps, but fail to address the other problems caused by contaminants present in the oil.

Another method for treating oil attempts to reduce the accumulation of free fatty acids and raise the smoke point of used cooking oil by mixing the used oil with an adsorbent of alkaline earth oxides or carbonates, which adsorbent is then separated out of the oil after mixing for between 3 and 15 minutes. In another method, used cooking oil is contacted with a composition of activated clay or magnesium silicate and between 15% to 75% weight of gel derived alumina to reduce both the amount of free fatty acids present in the oil as well as remove color from the oil. Yet another method for reducing the fatty acid content of used oil discloses contacting the oil with hydrated magnesium silicate. Once again, these methods treat only one or two problems with the used oil, thereby failing to significantly extend the overall shelf life of the oil.

One method for treating oil uses various silicas and acid-treated silicas to remove trace metals and phospholipids from used cooking oils, but fails to remove any other contaminants from the oil. In another treatment the used oil is contacted with a composition of 60% to 80% amorphous silica and 20% to 40% alumina. However, this method is ineffective in extending the life of the oil beyond about 5–10 days because the treatment fails to adequately reduce the levels of various contaminants. Moreover, each treatment with this product absorbs approximately 6 oz of oil for each 6 oz of the composition, thereby requiring frequent addition of more fresh oil.

Another method utilizes a metal-substituted silica xerogel having pH of at least 7.5 and optionally combined with an organic acid. This method is directed to removing contaminants such as phospholipids, soaps, metals and chlorophyll from glyceride oils. However the silica xerogel composition does not effectively decolorize the oil, and smoking of the oil occurs within about 5 days of use. As a result, oil treated with the silica xerogel will still require replacement after only about 5 to 7 days of use and treatment with the silica xerogel.

A commonly used treatment for frying oils is Silasorb™ (Celite corporation, Denver, Colo.), a synthetic calcium silicate. This treatment lowers free fatty acids in the oil by a combination of adsorption and neutralization. However, the neutralization of a fatty acid with an alkaline metal produces a fatty acid soap and may result in uncontrollable foaming, leading to safety hazards for operators of frying equipment. Additionally, Silasorb contributes to the darkening of the oil.

Yet another method directed to removal of free fatty acids from used oil involves treating a used cooking oil or fat with a composition of magnesium silicate and at least one alkali material. Whereas many other treatments involve contacting the oil with a composition that absorbs the contaminants in the oil, the composition of this method works at least in part by neutralization. For instance, the magnesium silicate acts as a bleaching agent to change the color of the color bodies within the oil, thereby lightening the color of the oil. However, the disadvantage to this method is that the magnesium silicate creates polar compounds as a byproduct of the neutralization process. The presence of additional polar compounds reduces the smoke point of the oil and increases the oxidation of the oil, which accelerates spoiling and may give the oil an unpleasant taste and/or odor. The magnesium silicate also increases the levels of certain chemicals, including unsaturated aldehydes such as 2,4-decadienal and 2,4-hexadienal, responsible for changes in flavor of fried food products. Repeated use of the compound imparts a metallic taste to chicken fried in the treated oil. These changes render food cooked in the treated oil unappealing to the average consumer. Additionally, the magnesium silicate generates excessive amounts of soap, and the oil begins to smoke after only 10 days of use and requires replacement in less than 2 weeks.

None of these existing methods and compositions have adequately addressed the removal of the several contaminants that contribute to the degradation of the oil, but have instead individually attacked the particular contaminant perceived to be the greatest concern in a particular system. Additionally, these treatments fail to significantly extend the life of the oil by eliminating enough of each contaminant to enable continued re-use of the oil beyond more than a few days.

Thus, what is needed in the art are compositions and methods for quickly and effectively reducing the amount of several contaminants such as polar material, color bodies, soaps, free fatty acids and trace metals, such that regular treatment with the compositions and methods significantly extends the useable life of the oil, thereby reducing health risks and costs of fried food operations.

SUMMARY OF THE INVENTION

The invention relates to methods and compositions for reducing the accumulation of contaminants in edible oils used for cooking food products and enables continued recycling of the oil while preserving the taste and quality of the oil and food cooked in the oil. As used herein, the term "contaminants" refers to any component that, upon accumulation in the oil, adversely effects the useful life, taste, or other properties of the oil. Such contaminants include but are not limited to water, soaps, polar compounds, free fatty acids, color bodies and trace metals.

In its broad aspects, the invention relates to a process for treating an edible cooking oil with a composition of silica, acidic alumina, clay, and citric acid. More particularly, the oil is contacted with the composition, heated, and then separated from the composition.

The invention provides methods and compositions for significantly reducing the accumulation of undesirable contaminants in cooking oil. Treating the oil with the composition of the invention removes contaminants from the oil, improves the color, flavor, smell and shelf life of the oil, and reduces the incidence of smoking and foaming of the oil. The invention further provides methods and compositions which are cost effective and extend the usable life of the oil, thereby further reducing the cost of producing fried foods.

In its broad aspects, the composition of the invention contains a mixture of silica, acidic alumina, clay and optionally, citric acid. The composition contains these ingredients in amounts effective to remove contaminants such as free fatty acids, polar materials, color bodies, metals and soaps. The removal of these contaminants reduces the incidence of foaming and smoking, preserves the color and flavor of the oil and extends the usable life of the oil.

The methods and compositions of the invention work quickly and efficiently and have been demonstrated to reduce the buildup of polar material, trace metals, free fatty acids and other contaminants as well as to prevent and counteract soap formation and smoking. The methods and compositions provided successfully remove contaminants at temperatures between 160° to 400° F. without migration, i.e., without creating a powder deposit on the surface of the oil or equipment, which has been known to occur with the use of existing oil treatment products.

Use of the methods and compositions of the invention in frying equipment in the fast food business has been demonstrated to reduce fat buildup in the frying equipment by approximately 98% and to extend the usable life of the oil up to 45 days without replacement. The invention also absorbs less oil during treatment, requiring less frequent addition of fresh oil. For instance, as described above, some existing oil treatments absorb up to as much as 6 oz of oil for every 6 oz of treatment material, per treatment; however, the composition of the present invention absorbs only about 2 oz of oil for every 6 oz of composition, thereby requiring less frequent addition of new oil.

The invention not only provides health benefits by decreasing contaminants, indigestible polymers and oxidized components, but also improves the taste of fried food cooked in the treated oil. The methods and compositions of the invention will also decrease significant health risks associated with used oil as well as reduce the production costs of fried foods.

These and further advantages of the present invention will become apparent after a review of the following detailed description of the disclosed embodiments.

BRIEF DESCRIPTION OF THE FIGURES

The invention can be more easily understood by referring to the drawings, described below, which are intended to be illustrative, and not limiting, of the scope of the invention.

DETAILED DESCRIPTION OF SPECIFIC EMBODIMENTS

The invention can be more clearly understood by referring to the following detailed description and specific examples. Although various changes and modifications within the spirit and scope of the invention will become apparent to those skilled in the art from reading this description, the description and examples are presented as illustrations and not intended to limit the scope of the invention in any way.

The invention rapidly and effectively reduces the amount of accumulated contaminants in edible oils used for cooking and/or frying food items. The contaminants removed by the invention include, but are not limited to, water, soaps, polar compounds, free fatty acids, color bodies and trace metals. Additionally, the removal of these various contaminants reduces the formation of soaps and subsequent foaming of the oil. The invention also removes contaminants such as polar compounds which lead to the lowering of the smoke point of the oil, darkening the color and increasing oxidation of the oil. Thus, the removal of these contaminants and prevention of the subsequent reactions caused by these contaminants increases the usable life of the oil by slowing the decomposition process.

Various components of the composition are believed to interact with the various contaminants present in the oil to remove them from the oil. In its broad aspects, the composition of the invention contains a mixture of alumina, silica, clay and, optionally, citric acid. This combination of materials interacts with the various contaminants present in the used oil, so that when the composition is added to the oil, the composition absorbs and/or adsorbs the contaminants from the oil. The contaminants are then removed from the oil upon separation of the composition from the oil after the treatment is complete. Preferably, the composition contains each of the ingredients in an amount effective to remove one or more contaminants such as polar materials, free fatty acids, soaps, and trace metals.

Desirably the composition contains between about 40% and about 60% silica, between about 5% and about 15% acidic alumina, between about 15% and about 35% clay, and between about 2% and about 10% citric acid. In a particular embodiment of the invention, the composition contains about 50% silica, about 10% acidic alumina, about 30% clay, and about 2% citric acid. Any remaining percentage constitutes water or other trace materials.

The silica is believed to aid in the removal of contaminants from the oil by absorbing and/or adsorbing various small molecule contaminants present in the oil. In one embodiment of the invention the silica is amorphous silica. In a particular embodiment the silica is a silica gel, more particularly a silica hydrogel. Even more particularly, the silica hydrogel has an effective pore diameter between about 10 and about 1000 Angstroms.

The clay is included in the composition primarily to decolorize the oil by the absorption and/or adsorption of color bodies. Desirably, the clay is activated clay which has been washed in acid and activated for 24 hours at approximately 500°–1000° C. This and other methods for producing activated clay are known to those of skill in the art and are within the scope of the invention.

Citric acid is believed to aid in the removal of the contaminants from the oil by acting to break down various contaminants into smaller molecules that may be absorbed and/or adsorbed by the other components, such as the silica, clay or alumina. Citric acid can also act as a stabilizer by inhibiting $O_2$ and peroxide radical reaction with the oil. Desirably, the citric acid in the composition is citric acid powder. More desirably, the powdered citric acid particles have a mean particle size of about 500 micrometers.

The acidic alumina of the composition desirably has a pH of about 2 to about 4 and preferably maintains a pH in this range at temperatures up to about 500° C., more particularly at temperatures of about 100° C. to about 500° C. The adsorption capacity of acidic alumina as compared with alumina neutral or alumina basic is at least four times better in terms of percent reduction of polar materials as well as in promoting the stability and shelf life of the oil. In a particular embodiment of the invention, the acidic alumina is an acid-washed alumina, for example, an acid washed alumina prepared according to the method disclosed in U.S. Pat. No. 5,133,871, which is hereby incorporated by reference.

The acidic alumina of the composition is preferably particulate, having a particle size ranging from about 30 to about 100 microns in diameter. In particular, it has been found that acidic alumina having pores with a diameter ranging from about 40 to about 500 Angstroms works very well according to the method of this invention. While not wishing to be bound to any particular theory, it is believed that the acidity of the alumina attracts the polar materials to the alumina, where the polar materials associate with the pores of the alumina thereby trapping the polar compounds and effectively removing them from the oil. Acidic alumina is also effective in the removal of plant waxes from oil, which proves advantageous in the use of vegetable oils and oils used for frying vegetables. In one embodiment of the invention the acidic alumina is an acid-washed alumina prepared according to the method disclosed in U.S. Pat. No. 5,133,871 in the form of particles having an average diameter of about 30 to about 100 microns and having pores of about 40 to about 500 Angstroms in diameter.

The components of the composition are combined and mixed to form a mixture that can be contacted with the oil to remove contaminants. In one embodiment of the invention, the composition is in the form of particles. Desirably, the particles range from about 30 to about 1000 microns in diameter, more particularly from about 30 to about 100 microns in diameter. Used oil is treated according to the invention by contacting the oil with an amount of the composition necessary to effectively reduce the level of contaminants in the oil. In one embodiment of the invention, the composition is added to used cooking oil in a ratio of about 1 oz of composition for about every 3.5 to 5 gallons of oil, or in a weight to weight ratio of about 0.004 lb of composition to every 1 lb of oil (approximately 1:250 wt/wt). Preferably about 0.1% to about 5% on a weight basis of composition is added to the oil, more preferably about 0.1% to about 0.5% is added. However, it will be recognized by one of skill in the art that the amount of the composition of the invention necessary to treat the oil will vary depending upon factors such as the type and volume of food cooked in the oil, the age of the oil, and the frequency of treatment. Thus, much smaller or larger amounts may be employed as necessary for each particular system.

According to the method of the invention, oil requiring treatment is contacted with the composition of the invention in order to remove contaminants from the oil and prevent the oil from spoiling. Preferably, the treatment is carried out at elevated temperatures. The composition may be added to preheated oil, or the oil may be heated after contact with the composition of the invention. Preferably the oil has a temperature from between about 160° F. to about 400° F., more preferably the temperature is from about 280° F. to about 360° F. The composition may be mixed with the oil. Preferably the composition is mixed with the oil for approximately 1 to approximately 10 minutes, preferably from approximately 1 to approximately 4 minutes. The composition is then separated from the oil by filtration or any other method known to those of skill in the art. In one embodiment of the invention, the composition is separated by filtering the oil through a paper filter with a micron rating between about 20 and about 100 microns.

The frequency of treatment according to the invention will vary depending upon the type of oil used, the volume and type of food cooked in the oil, as well as other factors. Typically, oil treated twice a day according to the methods of the invention will last up to about 28 to about 45 days. In one embodiment of the invention, 50 gallons of oil in a fryer at a typical fast food restaurant that is used to fry about 300 to about 500 pounds of chicken per day and that receives two treatments per day according to the methods and compositions of the invention will last about 28 days before requiring replacement. As described in greater detail in the following examples and as depicted in FIGS. 1 through 7, the invention is effective at reducing levels of contaminants in the oil and extending the usable life of the oil for several days, thereby reducing both health and safety risks as well as production costs associated with fried food operations.

EXAMPLES

Example 1

An oil treatment composition was prepared by combining 50% wt of silica hydrogel, 10% wt of acidic alumina particles having a particle size ranging from about 30 to about 100 microns and pores with a diameter ranging from about 40 to about 500 Angstroms, 30% wt of activated clay, and 2% wt citric acid powder. The composition was in the form of a powder with particles ranging from about 30 to about 100 microns.

Example 2

The composition of the invention was field tested using approximately 50 gallons of vegetable oil at a fast food restaurant where approximately 300 to 500 lbs of chicken per day were fried in the oil.

Approximately 12.8 oz of the composition made according to the method of Example 1 was added to the 50 gallons of oil at a temperature of approximately 350° F. After about 5 minutes the composition was separated from the oil by filtering the oil through a paper filter having a micron rating of 5 microns. The same oil was treated twice a day for 28 days with occasional addition of new oil as needed to maintain the volume at 50 gallons.

The oil was periodically tested before and after treatment to determine the total percentage of polar materials present in the oil, the amount of soap formation in ppm of sodium oleate and the percentage of free fatty acids present in the oil.

Figure 1:
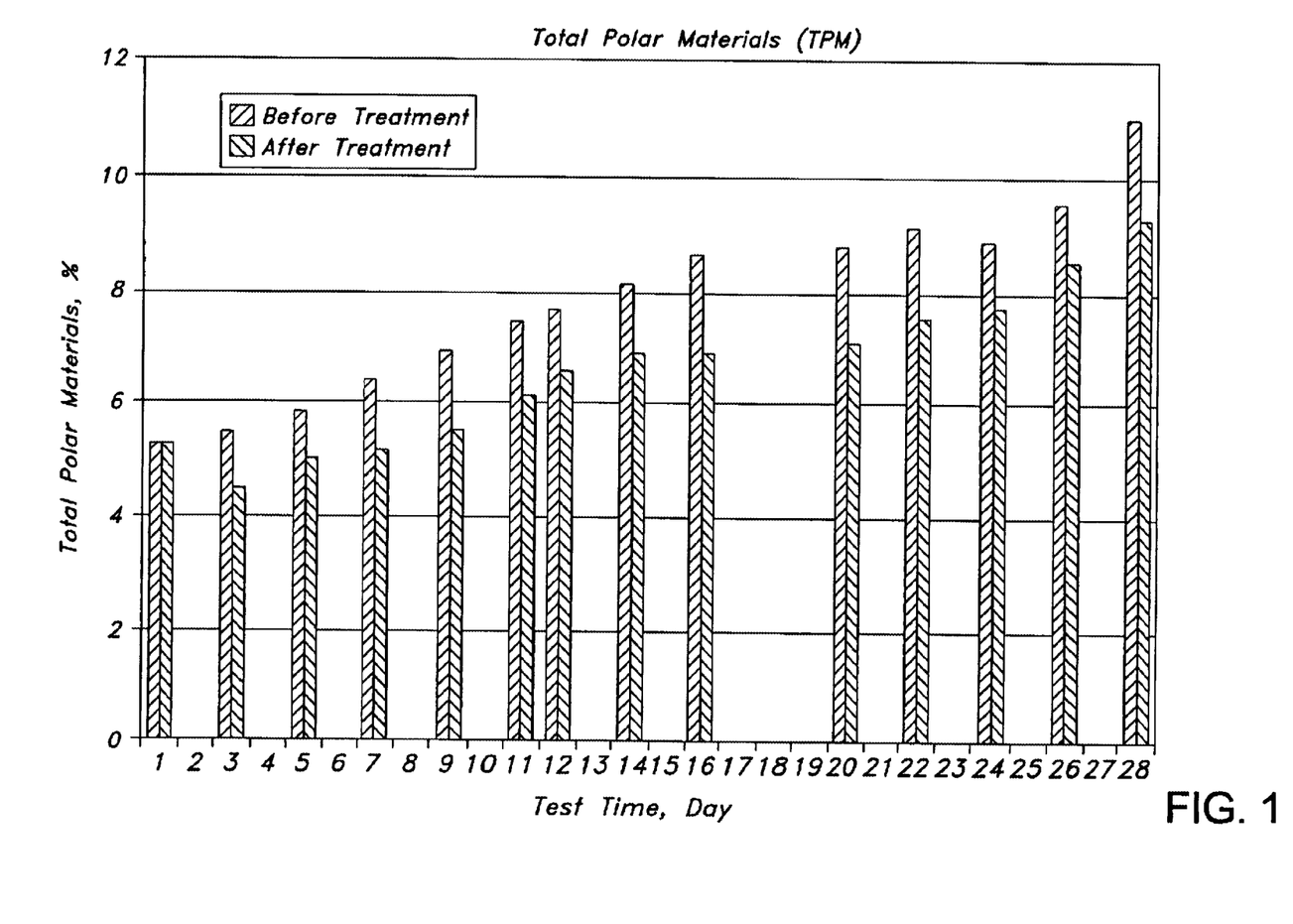
FIG. 1 is a bar graph showing the percent of total polar materials in used cooking oil before and after treatment with the composition of the invention over a 28 day period.

As shown in FIG. 1, the composition of the invention successfully reduced the amount of polar materials after each treatment as well as prevented significant increase in the total polar material level over the course of the testing. After 28 days, the total polar materials after treatment was approximately 8.6%, only 2% higher than the approximately 4.6% on day 1.

Figure 2:
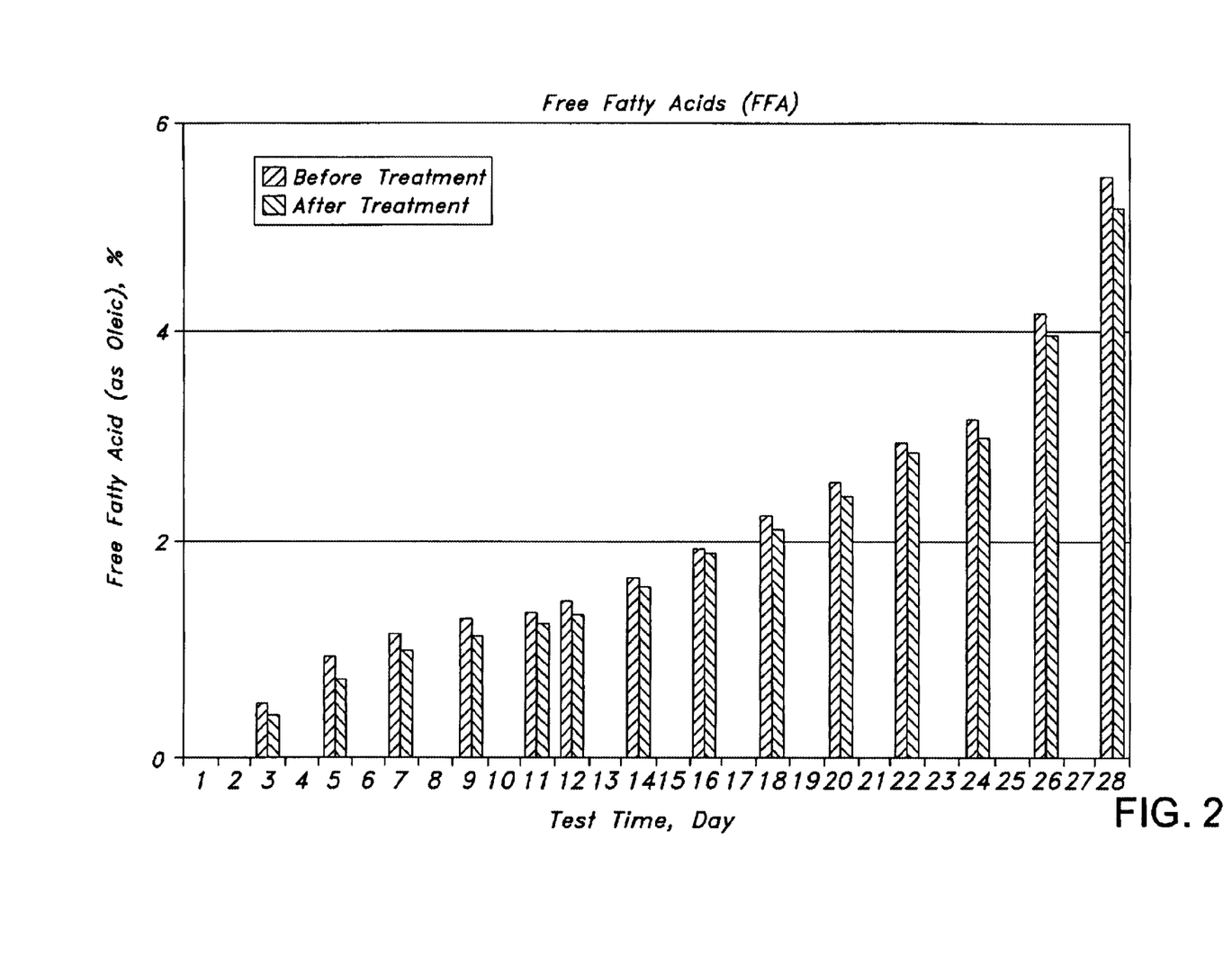
FIG. 2 is a bar graph comparing the percentage of free fatty acids present in cooking oil before and after treatment with the composition of the invention over 28 days of treatment.

FIG. 2 illustrates that the composition of the invention successfully reduced the amount of free fatty acids after each treatment as well as slowed the accumulation of free fatty acids over the course of the experiment.

Figure 3:
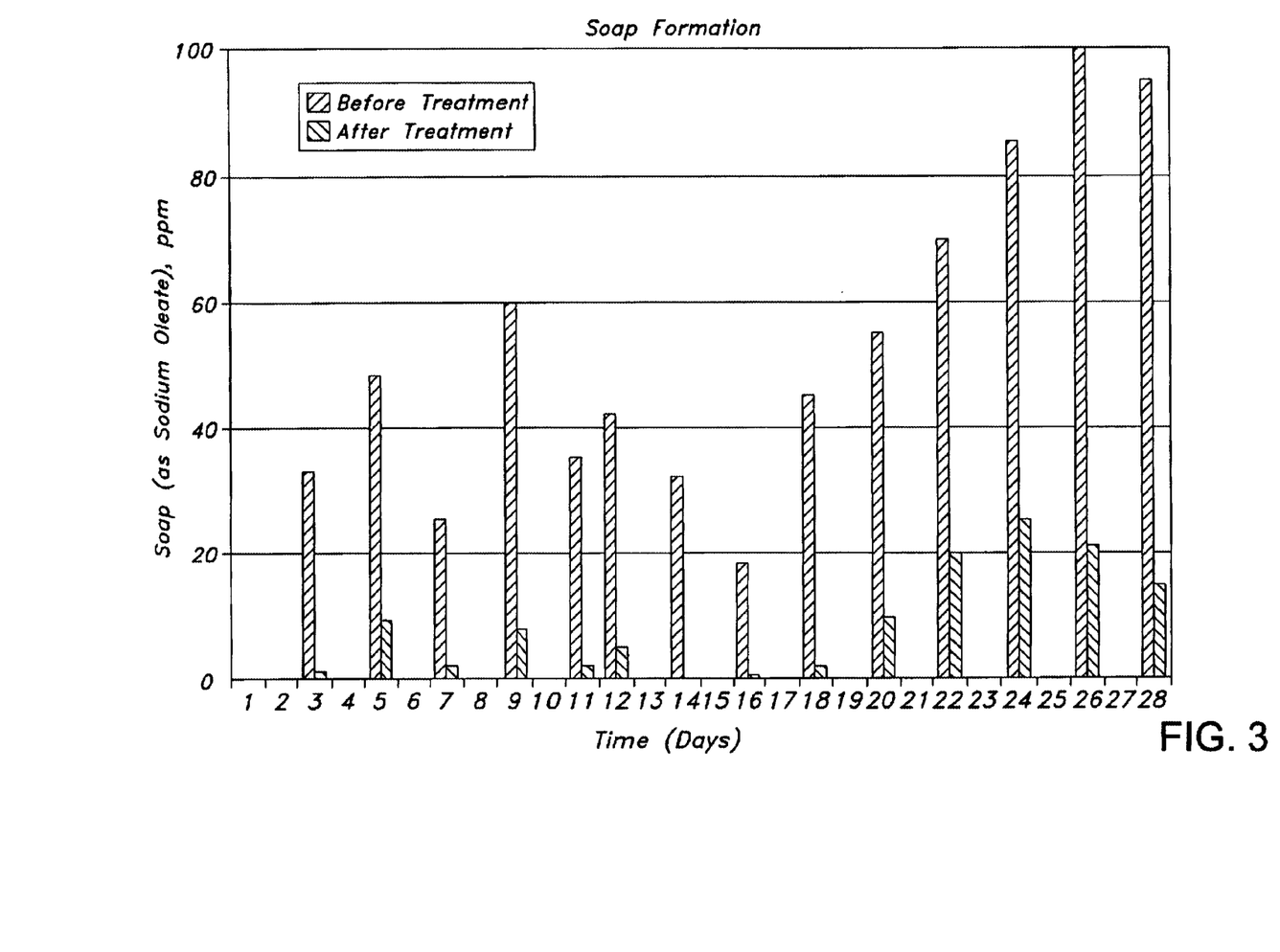
FIG. 3 is a bar graph showing the amount of soap present in an oil sample before and after treatment with the composition of the invention over 28 days.
Figure 4:
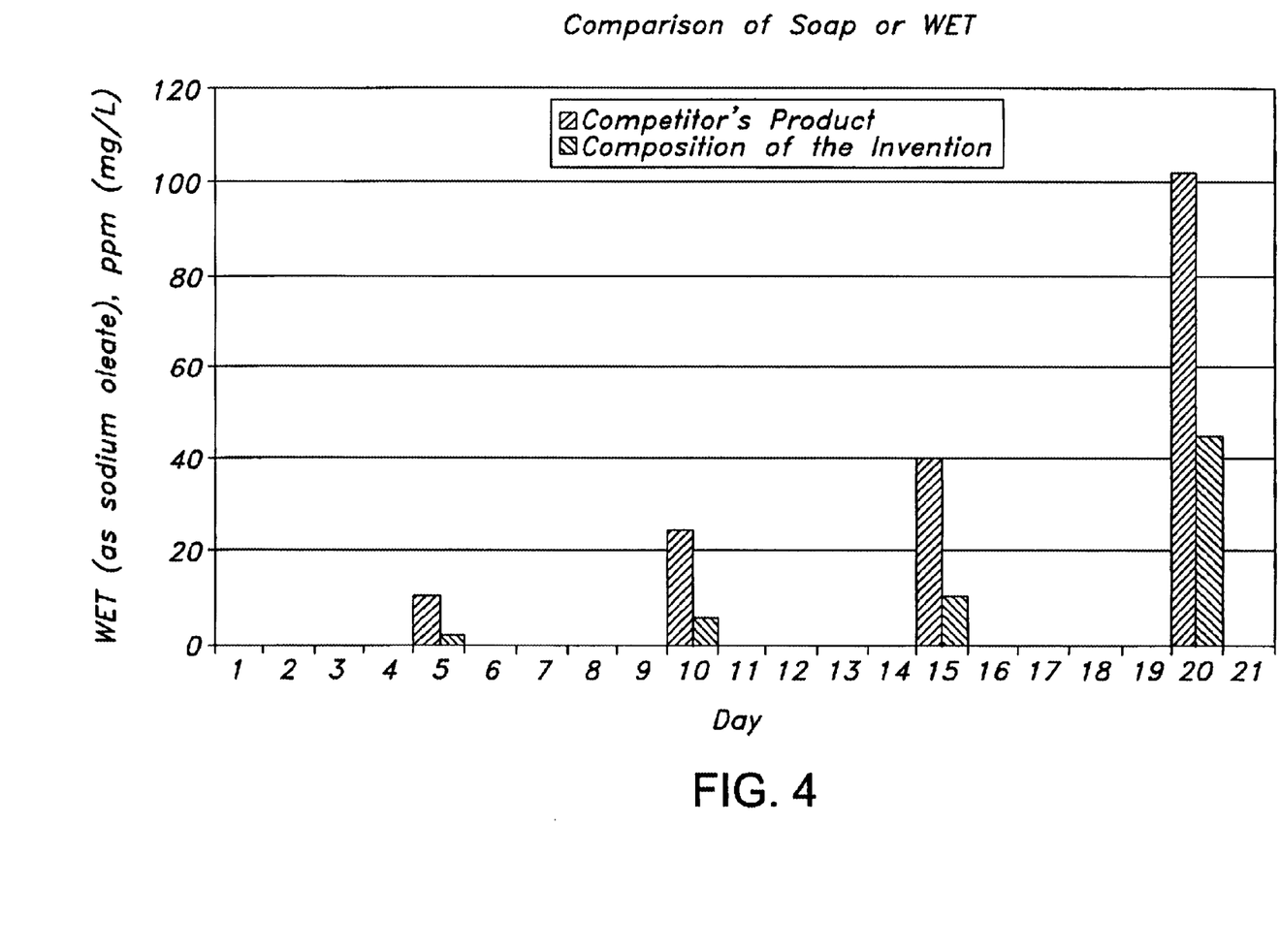
FIG. 4 is a bar graph comparing the performance of the composition of the invention to a composition of Magnesol™ (a commercially available treatment product containing magnesium silicate) in reduction of soap formation over a 21 day period.

As shown in FIG. 3, the composition of the invention significantly removed soap after each treatment as well as prevented significant increase in the total level of soap over the course of the experiment. Per treatment, the composition removed from 20 to 75 ppm of soap, with an average of about 40 ppm per treatment. After 28 days, the total soap after treatment was approximately 15 ppm, only 13 ppm higher than the approximately 2 ppm on day 1. The highest post treatment soap level was approximately 25 ppm on day 24 as opposed to the highest pre-treatment soap level of approximately 100 ppm on day 26.

Example 3

Approximately 50 gallons of vegetable oil was used to fry approximately 300 to 500 lbs of chicken per day for 21 days. The oil was treated with a composition made according to Example 1 twice a day as described in Example 2 for the length of the experiment. Another 50 gallons of vegetable oil under the same conditions of use was treated twice a day with Magnesol XL™, a composition of synthetic, hydrated amorphous magnesium silicate. The oil was tested before and after treatment every 5 days to determine the soap formation in ppm of sodium oleate. The results are presented in FIG. 4. The composition of the invention was found to outperform Magnesol XL. On day 20 the oil treated with Magnesol contained approximately 105 ppm soap as opposed to only about 45 ppm of soap in the oil treated with the composition made according to Example 1.

Example 4

The composition made according to Example 1 was compared to a composition of Magnesol™. Three fryers each containing 50 gallons of oil were used to fry approximately 300–500 lbs of chicken per day for 10 days. The oil in one fryer was left untreated, the oil in a second fryer was treated twice a day with 6.4 oz of Magnesol, and the oil in a third fryer was treated twice a day as described in Example 2 with 6.4 oz of a composition made according to Example 1. The oil in each fryer was tested after 10 days to determine the levels of various contaminants.

Figure 5:
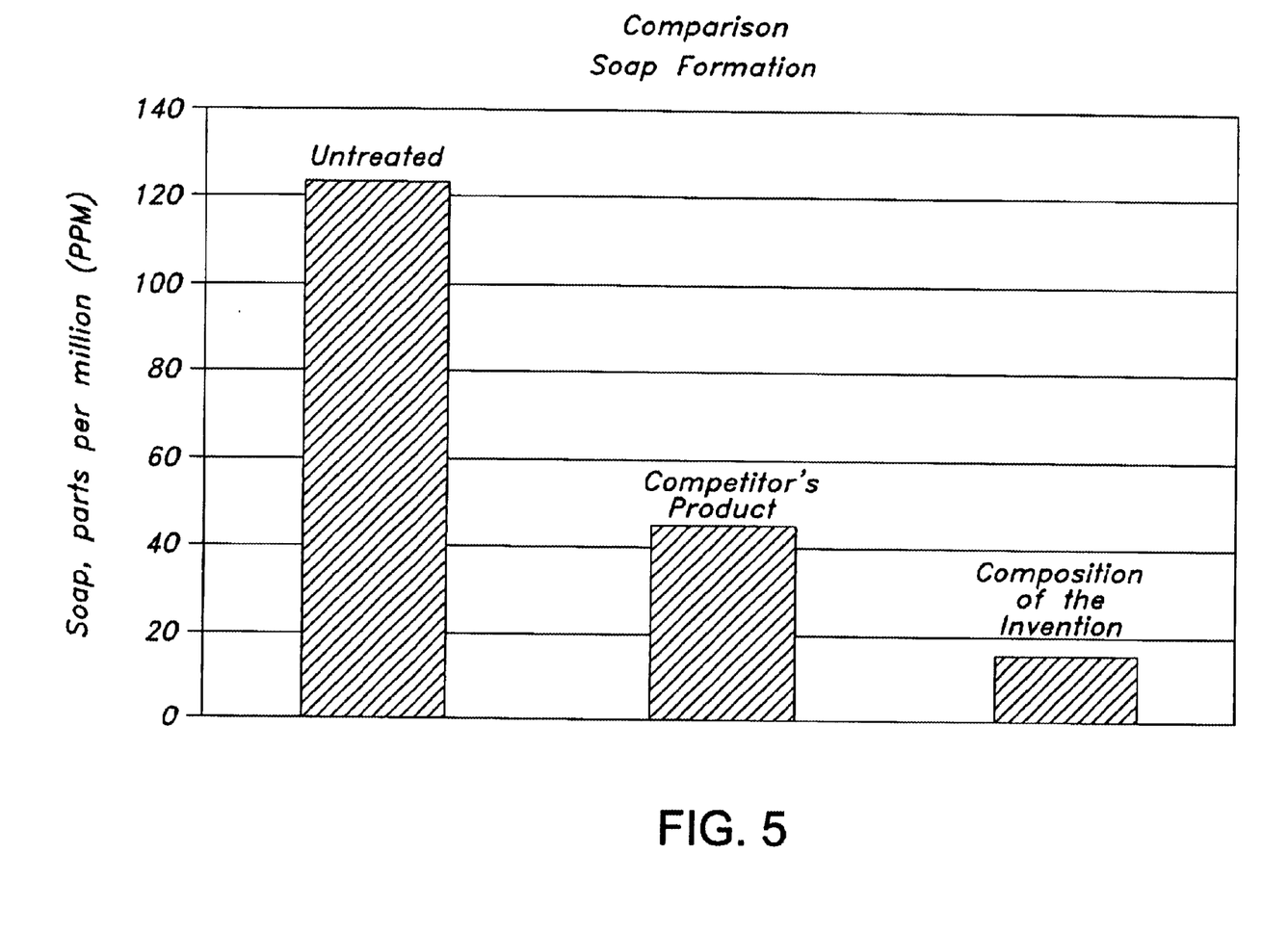
FIG. 5 is a bar graph comparing the level of soap present in samples of untreated oil, oil treated with Magnesol and oil treated with the composition of the invention.

FIG. 5 presents the comparison for the level of soap formation. The untreated oil had approximately 122 ppm of soap, and the oil treated with the Magnesol contained approximately 43 ppm of soap. The oil treated with the composition of Example 1 contained approximately 17 ppm of soap, thus outperforming the other product and significantly improving the quality of the oil over untreated oil.

Figure 6:
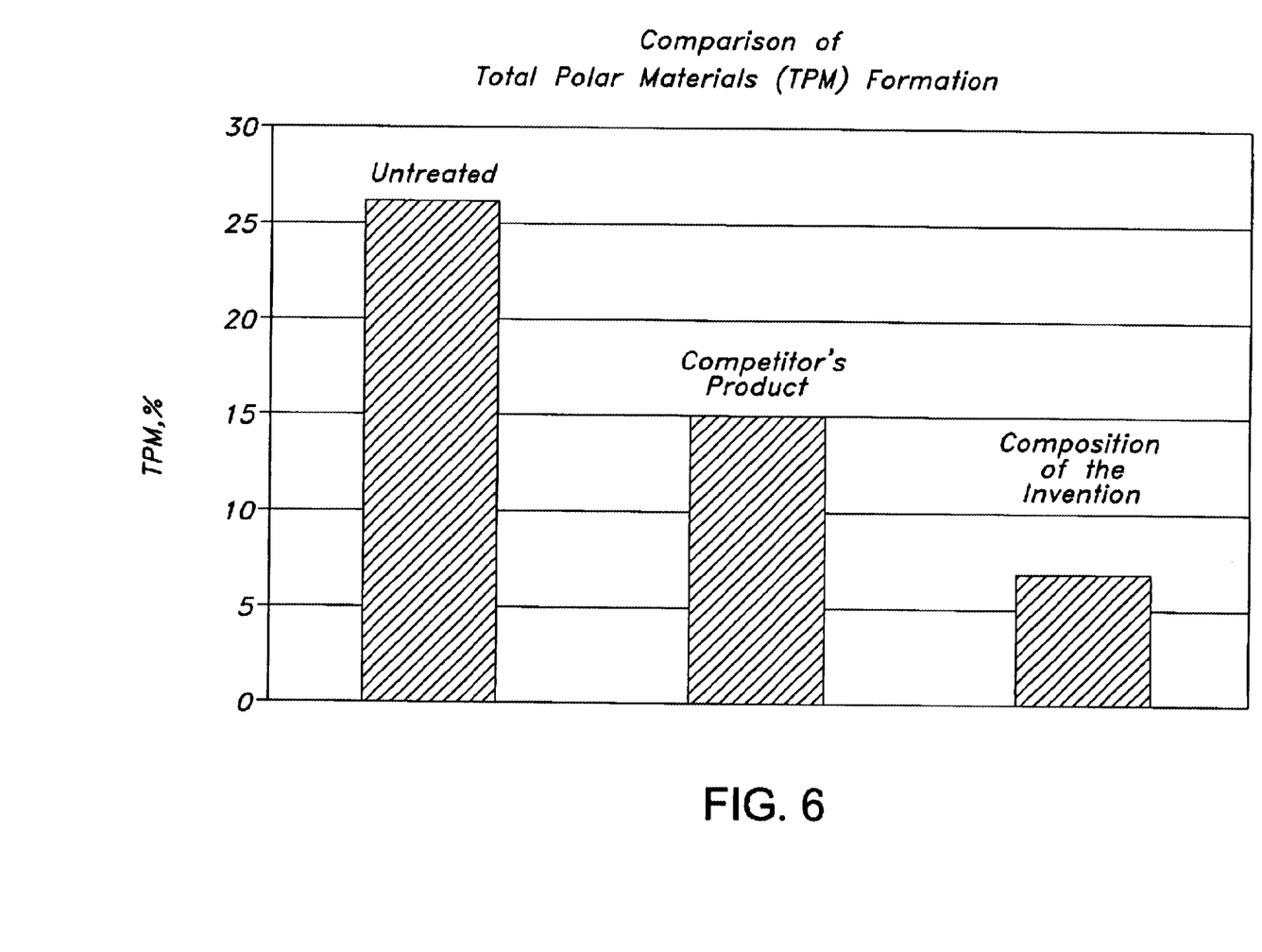
FIG. 6 is a bar graph depicting a comparison between the percentage of total polar material in untreated oil, oil treated with a composition of Magnesol and oil treated with the composition of the invention.
Figure 7:
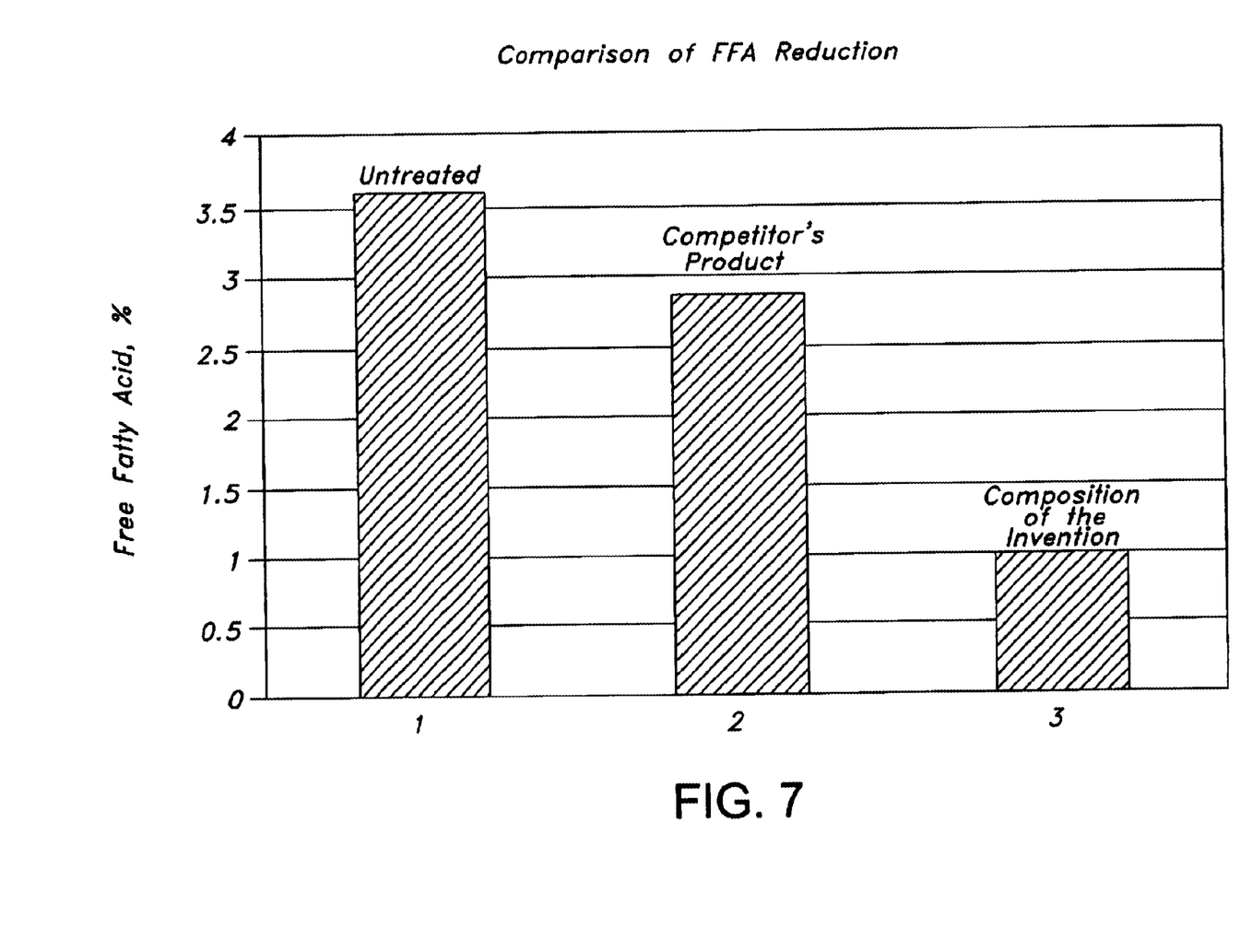
FIG. 7 is a bar graph comparing the percentage of free fatty acid present in samples of untreated oil, oil treated with a composition of Magnesol and oil treated with the composition of the invention.

FIG. 6 presents the levels of total polar materials present in the three fryers. The untreated oil contained over 25% total polar material, and the oil treated with Magnesol contained about 15% total polar material. The oil treated with the composition of the invention contained only about 7% total polar material, less than half the amount in the oil treated with the Magnesol and almost one quarter the amount in the untreated oil.

FIG. 8 illustrates the comparison between the Magnesol and the composition of the invention in terms of the ability to reduce the amount of free fatty acid in the used oil. The untreated oil contained just over 3.5% free fatty acid after 10 days, and the oil treated with the Magnesol had nearly 3% free fatty acid present in the oil after treatment on the 10th day. The oil treated with the composition described in Example 1 contained only about 1% of free fatty acid after treatment on the $10^{th}$ day, a reduction of more than 2.5% compared to the untreated oil and approximately 1.8% better than the Magnesol.

What is claimed is:

1. A process for removing contaminants from cooking oil comprising the steps of:
    a) contacting the oil with a composition comprising silica, acidic alumina, clay, and optionally citric acid; and
    b) separating the composition from the oil.
2. The process of claim 1, wherein each of the silica, acidic alumina, clay, and citric acid are present in an effective amount to remove one or more contaminants selected from polar materials, free fatty acids, metals, color bodies, or soaps.
3. The process of claim 1, wherein the composition comprises about 40% to about 60% silica, about 5% to about 15% acidic alumina, about 15% to about 35% clay, and about 2% to about 10% citric acid, wherein all percentages are by weight based on the total composition.
4. The process of claim 1, wherein the composition comprises about 50% silica, about 10% acidic alumina, about 30% clay, and about 2% to about 8% citric acid, wherein all percentages are by weight based on the total composition.
5. The process of claim 1, wherein the acidic alumina has a pH of about 2 to about 4.
6. The process of claim 5, wherein the acidic alumina maintains a pH of about 2 to about 4 at temperatures up to about 500° C.
7. The process of claim 6, wherein the acidic alumina is in the form of particles having a diameter of about 30 to about 100 microns.
8. The process of claim 7, wherein the acidic alumina has pores having a diameter of about 40 to about 500 Angstroms.
9. The process of claim 1, wherein the citric acid is powdered.
10. The process of claim 1, wherein the clay comprises an activated clay.
11. The process of claim 10, wherein the activated clay has been acid washed and activated by heating for about 24 hours at a temperature of about 500° to about 1000° C.
12. The process of claim 1, wherein the silica is amorphous silica.
13. The process of claim 12, wherein the silica is a silica hydrogel.
14. The process of claim 13, wherein the silica hydrogel has pores having an effective pore diameter of about 10 to about 1000 Angstroms.
15. The process of claim 1, wherein the composition is particulate.
16. The process of claim 15, wherein the particles have an average diameter of about 30 to about 1000 microns.
17. The process of claim 16, wherein the particles have an average diameter of about 30 to about 100 microns.
18. The process of claim 1, wherein the oil is used oil from a food fryer.
19. The process of claim 18, wherein the oil has been used to fry food selected from poultry, meat, fish, potatoes, vegetables, dough products, or combinations thereof.
20. The process of claim 1, wherein the oil is heated to a temperature of about 160° F. to about 400° F.
21. The process of claim 20, wherein the oil is heated to a temperature of about 280° F. to about 360° F.
22. The process of claim 1, wherein the oil is separated from the composition by filtering the oil through a paper filter with a micron rating of about 20 to about 200 microns.
23. The process of claim 1, wherein the oil is in contact with the composition in an amount of at least about 0.1% wt.
24. The process of claim 1, wherein the oil is in contact with the composition in an amount ranging from about 0.1% wt to about 5% wt.
25. A process for removing contaminants from cooking oil comprising the steps of:
    a) contacting the oil with a composition comprising about 40% to about 50% silica hydrogel, about 5% to about 15% acidic alumina having a pH of about 2 to about 4 and pores having a diameter of about 40 to about 500 Angstroms, about 15% to about 35% activated clay, and about 2% to about 10% citric acid, wherein all percentages are by weight based on the total composition;
    b) heating the oil and composition mixture to a temperature of about 280° F. to about 360° F.;
    c) mixing the oil and composition mixture for about 1 to about 10 minutes; and
    c) separating the composition from the oil.
26. A composition for removing contaminants from cooking oil comprising silica, acidic alumina, clay, and citric acid, wherein each of the silica, acidic alumina, clay, and optionally citric acid are present in an effective amount to remove one or more contaminants selected from polar materials, free fatty acids, metals, color bodies, or soaps.
27. The composition of claim 26, wherein the composition comprises about 40% to about 60% silica, about 5% to about 15% acidic alumina, about 15% to about 35% clay, and about 2% to about 10% citric acid, wherein all percentages are by weight based on the total composition.
28. The composition of claim 26, wherein the composition comprises about 50% silica, about 10% acidic alumina, about 30% clay, and about 2% to about 8% citric acid, wherein all percentages are by weight based on the total composition.
29. The composition of claim 26, wherein the acidic alumina has a pH of about 2 to about 4.
30. The composition of claim 29, wherein the acidic alumina maintains a pH of about 2 to about 4 at temperatures of up to about 500° C.
31. The composition of claim 30, wherein the acidic alumina is in the form of particles having a diameter of about 30 to about 100 microns.
32. The composition of claim 30, wherein the acidic alumina has pores having a diameter of about 40 to about 500 Angstroms.
33. The composition of claim 26, wherein the citric acid is powdered.
34. The composition of claim 26, wherein the clay comprises an activated clay.
35. The composition of claim 34, wherein the activated clay has been acid washed and activated by heating for about 24 hours at a temperature of about 500° to about 1000° C.
36. The process of claim 26, wherein the silica is amorphous silica.

37. The process of claim 36, wherein the silica is a silica hydrogel.

38. The process of claim 37, wherein the silica hydrogel has pores having an effective pore diameter of about 10 to about 1000 Angstroms.

39. The composition of claim 26, wherein the composition is particulate.

40. The composition of claim 39, wherein the particles have an average diameter of about 30 to about 1000 microns.

41. The composition of claim 40, wherein the particles have an average diameter of about 30 to about 1000 microns.

42. The composition of claim 26, wherein the oil is used fryer oil.

43. The composition of claim 26, wherein the oil has been used to fry food selected from poultry, meat, fish, potatoes, vegetables, dough products, or combinations thereof.

44. A composition for removing contaminants from cooking oil comprising about 40% to about 50% silica hydrogel, about 5% to about 15% acidic alumina having a pH from about 2 to about 4 and having pores with a diameter of about 40 to about 500 Angstroms, about 15% to about 35% activated clay, and about 2% to about 10% citric acid, wherein the composition removes one or more contaminants selected from polar materials, free fatty acids, metals, color bodies, or soaps.

\* \* \* \* \*